United States Patent
Pavithran et al.

(10) Patent No.: US 8,891,007 B2
(45) Date of Patent: Nov. 18, 2014

(54) CAMERA MODULE WITH PROTECTIVE AIR VENTILATION CHANNEL

(75) Inventors: Prebesh Pavithran, Bukit Mertajim (MY); Yeow Thiam Ooi, Butterworth (MY); Haw Chyn Cheng, Butterworth (MY); Hung Khin Wong, Sungair Ara (MY); Giap Chye Toh, Betterworth (MY)

(73) Assignee: DigitalOptics Corporation, San Jose, CA (US)

( * ) Notice: Subject to any disclaimer, the term of this patent is extended or adjusted under 35 U.S.C. 154(b) by 105 days.

(21) Appl. No.: 13/413,202

(22) Filed: Mar. 6, 2012

(65) Prior Publication Data

US 2012/0229701 A1 Sep. 13, 2012

Related U.S. Application Data

(60) Provisional application No. 61/450,040, filed on Mar. 7, 2011.

(51) Int. Cl.
*H04N 5/225* (2006.01)

(52) U.S. Cl.
CPC .......... *H04N 5/2257* (2013.01); *H04N 5/2253* (2013.01); *H04N 5/2252* (2013.01)
USPC ........................................................ 348/374

(58) Field of Classification Search
USPC ........................................................ 348/374
See application file for complete search history.

(56) References Cited

U.S. PATENT DOCUMENTS

| | | | | |
|---|---|---|---|---|
| 7,262,405 B2 * | 8/2007 | Farnworth et al. | ............ | 250/239 |
| 7,554,599 B2 * | 6/2009 | Tu et al. | ........................ | 348/340 |
| 8,194,182 B2 * | 6/2012 | Kinoshita | ..................... | 348/374 |
| 2008/0237768 A1 * | 10/2008 | Yajima et al. | ................. | 257/434 |
| 2010/0149410 A1 * | 6/2010 | Matsuzawa | .................. | 348/374 |

* cited by examiner

*Primary Examiner* — Anthony J Daniels
(74) *Attorney, Agent, or Firm* — Larry E. Henneman, Jr.; Gregory P. Gibson; Henneman & Associates, PLC

(57) ABSTRACT

A camera module with a vent in a housing thereof to allow for fluid communication between an interior of the camera module and an exterior of the camera module. A micro-porous membrane filter having a pore size smaller than 10 um is employed to cover the vent so as to reduce the flow of contaminants into the camera module.

21 Claims, 6 Drawing Sheets

CAMERA MODULE WITH PROTECTIVE AIR VENTILATION CHANNEL

CROSS REFERENCE

This application is the non-provisional of U.S. Provisional Pat. Appl. No. 61/450,040, filed Mar. 7, 2011, entitled "CAMERA MODULE WITH PROTECTIVE AIR VENTILATION CHANNEL," which is hereby incorporated by reference into this application.

BACKGROUND

Digital camera modules are currently being incorporated into a variety of electronic devices. Such camera hosting devices include, but are not limited to, cellular telephones, personal data assistants (PDAs), and computers. The demand for digital camera modules continues to grow as the ability to incorporate the camera modules into host devices expands. Therefore, one design goal of digital camera modules is to make them as small as possible so that they will fit into an electronic device without substantially increasing the overall size of the device. Means for achieving this goal must, of course, preserve the quality of the image captured by the camera modules.

Such digital camera modules typically include a substrate, an image capture device, a housing, and a lens unit. The substrate is typically a printed circuit board (PCB) that includes circuitry to facilitate data exchange between the image capture device and the host device. The image capture device is mounted and electrically coupled to the circuitry of the PCB. The housing is then mounted on the PCB over the image capture device. The housing includes an opening that receives and centers the lens unit with respect to the image capture device. Typically, the opening includes a set of threads and the lens unit includes a complementary set of threads that facilitate the factory focusing of the camera module. During a factory focus operation, for example, focusing equipment rotates the lens unit with respect to the housing, which adjusts the distance between the lens unit and the image capture device. When the lens unit is properly focused, it is fixed in position with respect to the housing with an adhesive, a thermal weld, or the like. The housing also includes some type of ventilation opening so as to prevent a pressure differential between the inside and outside of the camera module that could otherwise damage sensitive camera module components (i.e., image capture device, lenses, filters, etc.). Ventilation is especially important during manufacturing processes when the camera module components are exposed to drastic temperature changes.

Although an opening is often necessary for ventilation, it also leads to problems. For example, particulate matter (e.g., dust, debris, etc.) can infiltrate the camera module through the opening. Of course, it is well known that when such matter contaminates a camera module, it substantially degrades image quality. During the manufacturing of camera modules, the internal components are especially vulnerable to contamination. Typically, contaminated camera modules are discarded, which can be expensive when yield losses are high. Minimizing such contamination typically requires expensive manufacturing processes that are carried out in special clean rooms. Even so, it is still difficult to prevent such contamination. Camera modules are also vulnerable to contamination after they are incorporated into host devices.

In an effort to reduce such contamination, some camera module manufacturers have reduced the size of the ventialation opening. However, size reduction is constrained by current tooling limitations and moding capabilities. Currently, the openings are approximately 0.03~0.05 mm×0.15 mm.

What is needed, therefore, is a design for a camera module that includes air ventilation through which debris cannot pass. What is also needed is a design for a camera module that can be manufactured more easily and at higher success rate. What is also needed is a design for a camera module that has improved image quality.

It is against this background that a novel camera module design has been developed.

SUMMARY

Disclosed herein is a camera module that includes a substrate; an image sensor attached to the substrate; a housing attached to the substrate, the housing having a first opening into which a lens is received, and a second opening to provide fluid communication between the interior of the camera module and the exterior of the camera module; and a filter covering the second opening to allow air to pass therethrough while reducing the amount of contaminants passing therethrough.

The filter may include a micro-porous membrane. The filter may have a pore size smaller than 10 um. The second opening may allow the air pressure in the interior of the camera module to be the same as the air pressure in the exterior of the camera module. The filter may be attached to the housing via an adhesive. The adhesive may include glue or tape. The filter may be attached to the housing via an annular channel in the housing that receives the filter. The housing may further include a recess that receives the filter. The camera module may further include an IR filter that reduces the amount of IR energy reaching the image sensor.

The lens is fixably received within the housing. The lens is movably received within the housing. Other than the second opening, the camera module is sealed to minimize any fluid communication between the interior of the camera module and the exterior of the camera module.

Also disclosed herein is a camera module including a substrate; an image sensor attached to the substrate; a housing attached to the substrate, the housing having a first opening into which a lens is received, and a second opening to provide fluid communication between the interior of the camera module and the exterior of the camera module, wherein the second opening allows the air pressure in the interior of the camera module to be the same as the air pressure in the exterior of the camera module; and a filter covering the second opening to allow air to pass therethrough while reducing the amount of contaminants passing therethrough, wherein the filter includes a micro-porous membrane. The housing further includes a recess that receives the filter.

BRIEF DESCRIPTION OF THE DRAWINGS

FIG. 4 shows a different perspective view of the camera module of FIG. 3a.

DETAILED DESCRIPTION

Figure 1:
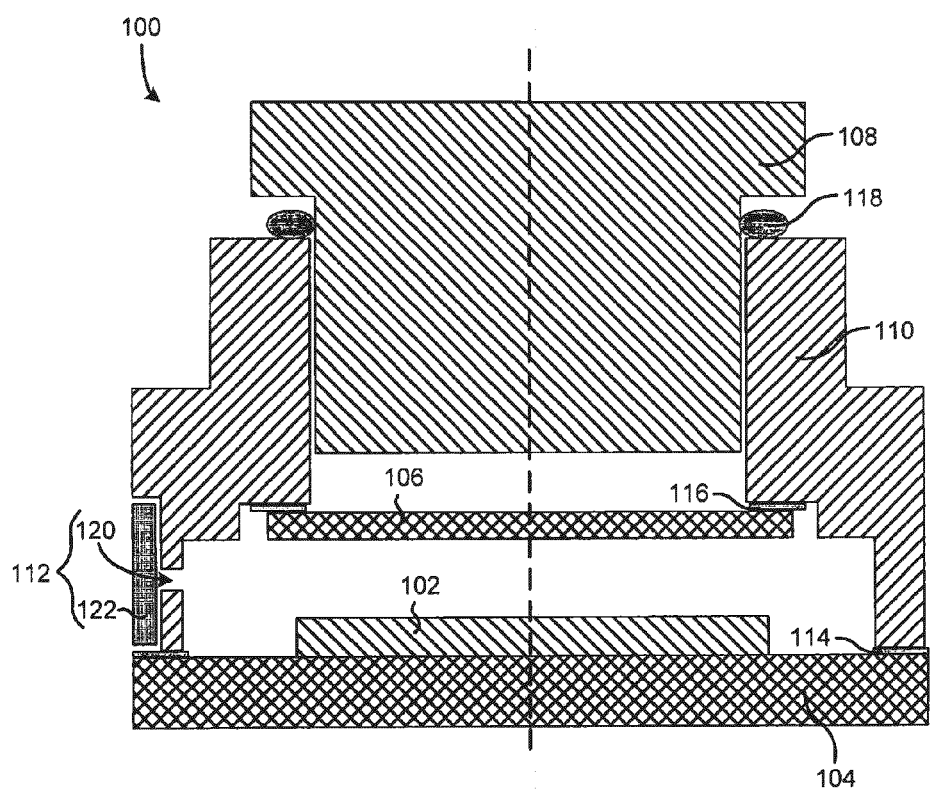
FIG. 1 is a cross sectional view of a fixed-focus (FF) camera module according to one embodiment.

While the embodiments of the present invention are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims.

FIG. 1 shows a cross sectional view of a fixed-focus (FF) camera module 100 according to one embodiment. The camera module 100 includes an image sensor 102, a substrate 104, an infrared (IR) filter 106, a lens system 108, a housing/holder 110, and a ventilation system 112. Image sensor 102 is mounted on and electrically coupled to the substrate 104 by some suitable means. Substrate 104, IR filter 106, and lens system 108 are attached to the housing/holder 110 via glue 114, 116, and 118, respectively. Further, glue 114, 116 and 118 also forms a seal between substrate 104, IR filter 106, and lens system 108, respectively, and the housing/holder 110. The ventilation system 112 includes a ventilation channel 120 and a micro-porous membrane filter 122. In this particular embodiment, the ventilation channel 120 is molded to or in the holder/housing 110. The micro-porous membrane filter 122 permits the flow of air through the channel 120 while preventing the flow of foreign contaminants (i.e., dust, debris, etc.) into the camera module 100.

Figure 2:
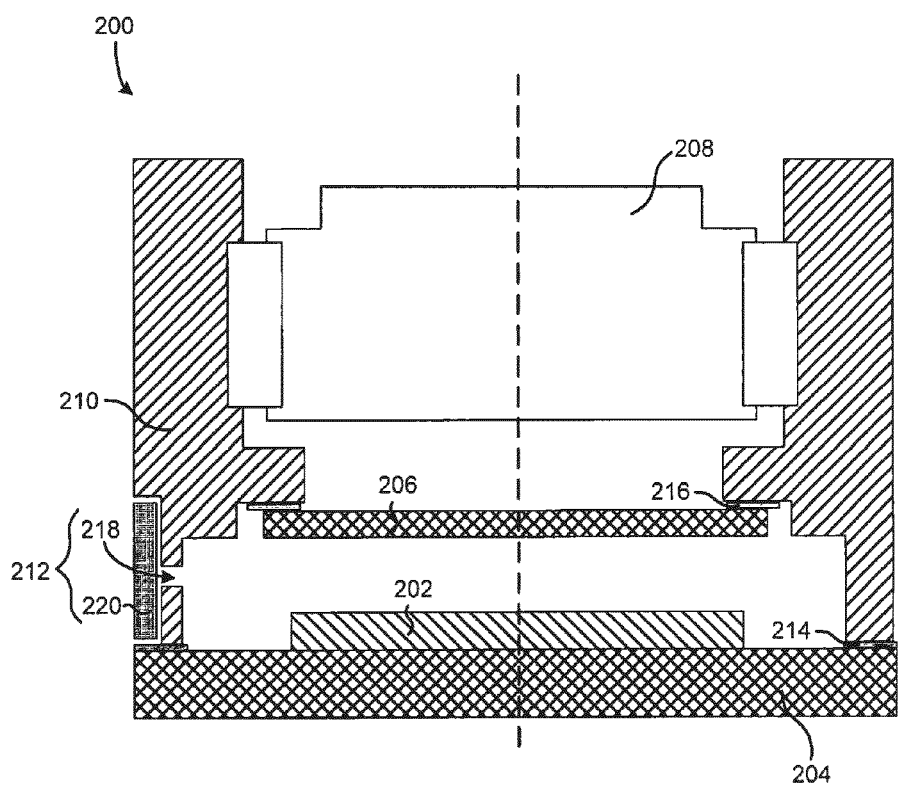
FIG. 2 is a cross sectional view of an auto-focus (AF) camera module according to another embodiment.

FIG. 2 shows a cross sectional view of an auto-focus (AF) camera module 200 according to another embodiment. The camera module 200 includes an image sensor 202, a substrate 204, an IR filter 206, a lens system 208, an actuator system 210, and a ventilation system 212. The image sensor 202 is mounted on and electrically coupled to the substrate 204 by some suitable means. The substrate 204 and the IR filter 206 are attached to the actuator system 210 via glue 214 and 216, respectively. Further, glue 214 and 216 also forms a seal between the substrate 204 and the IR filter 206, respectively, and the actuator system 210. The ventilation system 212 includes a ventilation channel 218 and a micro-porous membrane filter 220. In this particular embodiment, the ventilation channel 218 is on or in the actuator system 210. The micro-porous membrane filter 220 permits the flow of air through the channel 218 while preventing the flow of foreign contaminants (i.e., dust debris, etc.) into the camera module 200.

Figure 3A:
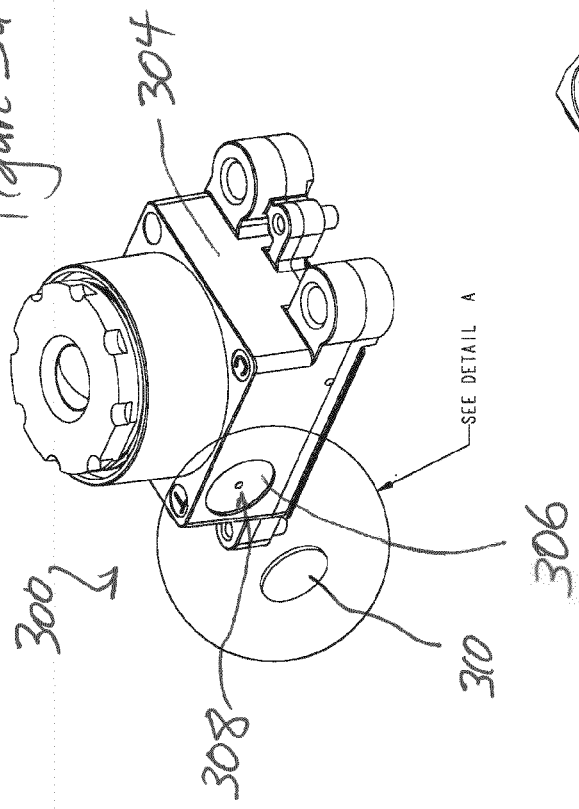
FIGS. 3a and 3b show perspective views of a FF camera module according to another embodiment.
Figure 3B:
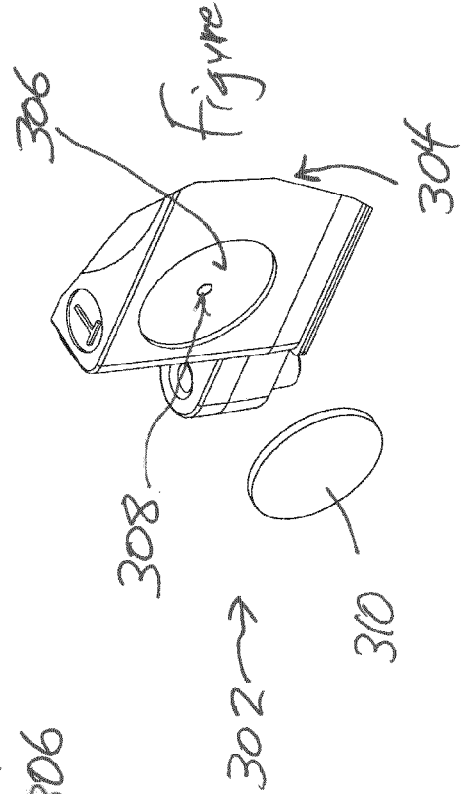

FIG. 3a shows a FF camera module 300. As shown in a close-up window 302 (FIG. 3b), a housing 304 of camera module 300 includes a circular recess 306 that is concentric to a ventilation hole 308. The recess 306 is adapted to seat a micro-porous protective membrane 310 that permits air to flow through the ventilation hole 308 but prevents contaminants from entering into the housing 304 through the ventilation hole 308. It should be understood that the protective membrane 310 is shown removed so that the recess 306 and the ventilation hole 308 are visible. However, when the camera module 300 is completely assembled, the protective membrane 310 is fixably seated in the recess 306 so as to cover the ventilation hole 308.

Figure 4:
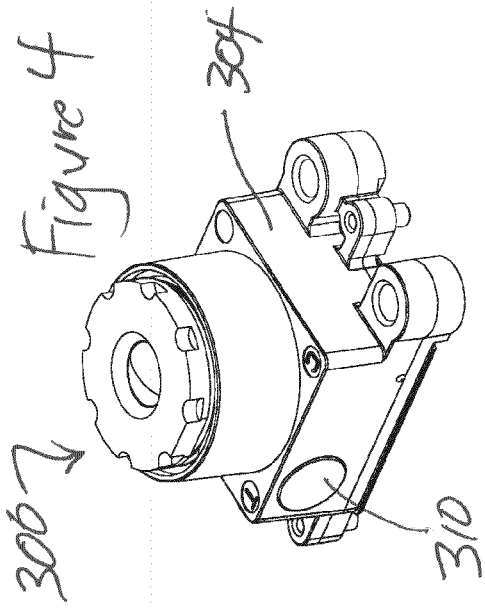

FIG. 4 shows the camera module 300 assembled wherein the protective membrane 310 is fixably seated in the recess 306 so as to cover the ventilation hole 308.

Figure 5:
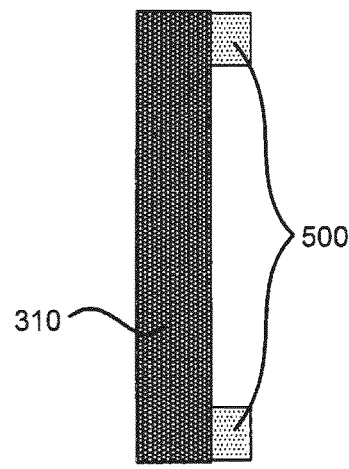
FIG. 5 illustrates a first mounting concept for mounting a protective membrane in a camera module.

FIG. 5 shows a first mounting concept for mounting the protective membrane 310. As shown, adhesive (e.g. glue, double-sided tape, etc.) 500 is formed around the perimeter of one side of the protective membrane. When the protective membrane 310 is seated in the recess 306, the adhesive 500 adheres to the exterior wall of the housing 304 in the recess 306 around the ventilation hole 308. Accordingly, the protective membrane 310 functions as an air filter.

Figure 6:
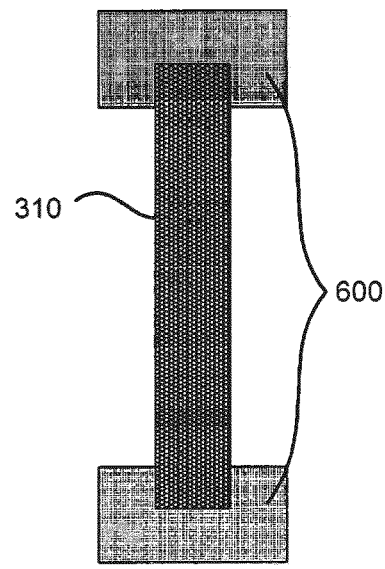
FIG. 6 illustrates a second mounting concept for mounting a protective membrane in a camera module.

FIG. 6 illustrates a second mounting concept for mounting the protective membrane 310. As shown, the protective membrane 310 is seated within an annular channel of a plastic holder 600. The plastic holder 600 could be mounted to the housing 304 over the ventilation hole 308 via any suitable means such as, for example, adhesive, thermal weld, tape, etc. Alternatively, the plastic holder 600 could be formed as an integral part of the housing 304.

Figure 7:
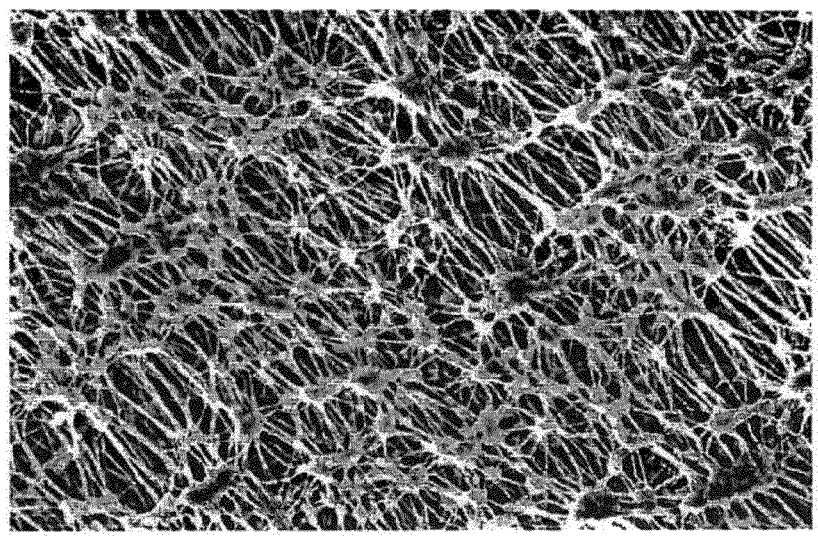
FIG. 7 is a close-up view of the structure of the protective membrane.

FIG. 7 shows a close-up image of the structure of the protective membrane 310. It should be understood that any type of membrane could be used so long as it is suitable for filtering contaminants while permitting air flow. Three examples of potentially suitable sources for such material are found at the Membrane Solutions, LLC website (under Membrane Filters), the Dewal Industries, Inc. website (under Porous Products), and the W. L. Gore & Associates, Inc. website (under Microfiltration Media). By way of example only, it may be preferable for the membrane to have a pore size smaller than 10 um.

Figure 8:
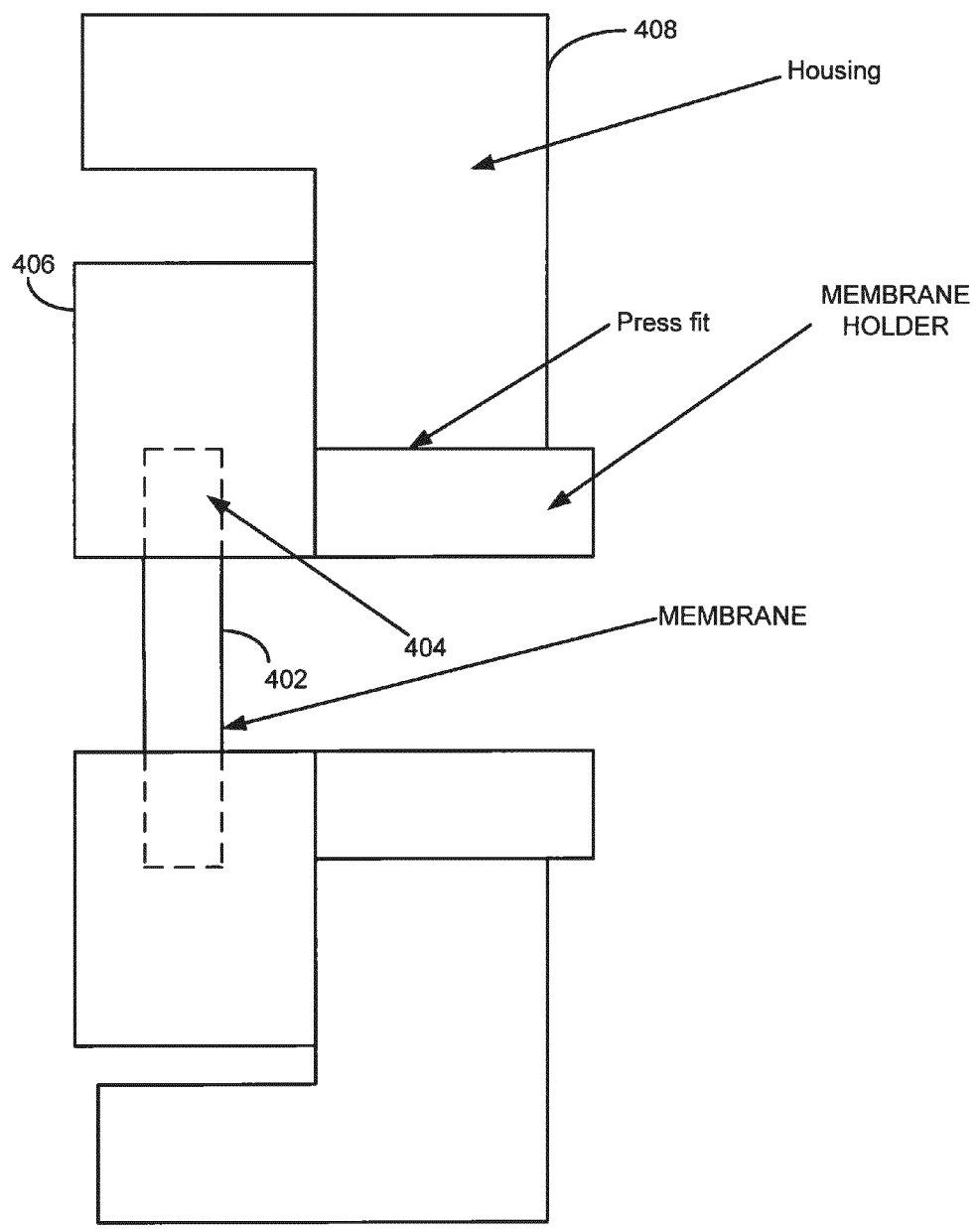
FIG. 8 is a close-up view of a third mounting concept for mounting a protective membrane in a camera module.

FIG. 8 shows an alternative arrangement for attaching the protective membrane to the camera module. Here, a membrane 402 is held in place in an annular channel 404 in a membrane holder 406. The membrane holder 406 is retained in a housing 408 of the camera module via a portion of the holder 406 that is press-fit into the vent hole.

The embodiments described herein show a single cylindrical vent and a circular recess that receives a circular membrane. Of course, any number, shape, or arrangement of vents could be employed. Similarly, the particular shape of the membrane may be of little importance, as long as the vent is covered and the membrane can be suitably attached to the camera module. Also, while glue, tape, an annular channel, and a press-fit membrane holder are described as methods for attaching the membrane, any other suitable method could be used.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A camera module, comprising:
   a substrate;
   an image sensor attached to the substrate;
   a housing attached to the substrate, the housing having a first opening into which a lens is received, and a second opening to provide fluid communication between the interior of the camera module and the exterior of the camera module; and
   a filter covering the second opening to allow air to pass therethrough while reducing the amount of contaminants passing therethrough.

2. A camera module as defined in claim 1, wherein the filter includes a micro-porous membrane.

3. A camera module as defined in claim 2, wherein the filter has a pore size smaller than 10 um.

4. A camera module as defined in claim 1, wherein the filter has a pore size smaller than 10 um.

5. A camera module as defined in claim 1, wherein the second opening allows the air pressure in the interior of the camera module to be the same as the air pressure in the exterior of the camera module.

6. A camera module as defined in claim 1, wherein the filter is attached to the housing via an adhesive.

7. A camera module as defined in claim 6, wherein the adhesive includes glue.

8. A camera module as defined in claim 6, wherein the adhesive includes tape.

9. A camera module as defined in claim 1, wherein the filter is attached to the housing via an annular channel in the housing that receives the filter.

10. A camera module as defined in claim 9, wherein the housing further includes a recess that receives the filter.

11. A camera module as defined in claim 1, wherein the housing further includes a recess that receives the filter.

12. A camera module as defined in claim 1, wherein the camera module further includes an IR filter that reduces the amount of IR energy reaching the image sensor.

13. A camera module as defined in claim 1, wherein the lens is fixably received within the housing.

14. A camera module as defined in claim 1, wherein the lens is movably received within the housing.

15. A camera module as defined in claim 1, wherein, other than the second opening, the camera module is sealed to minimize any fluid communication between the interior of the camera module and the exterior of the camera module.

16. A camera module, comprising:
a substrate;
an image sensor attached to the substrate;
a housing attached to the substrate, the housing having a first opening into which a lens is received, and a second opening to provide fluid communication between the interior of the camera module and the exterior of the camera module, wherein the second opening allows the air pressure in the interior of the camera module to be the same as the air pressure in the exterior of the camera module; and
a filter covering the second opening to allow air to pass therethrough while reducing the amount of contaminants passing therethrough, wherein the filter includes a micro-porous membrane;
wherein the housing further includes a recess that receives the filter.

17. A camera module as defined in claim 16, wherein the filter has a pore size smaller than 10 um.

18. A camera module as defined in claim 16, wherein the camera module further includes an IR filter that reduces the amount of IR energy reaching the image sensor.

19. A camera module as defined in claim 16, wherein the lens is fixably received within the housing.

20. A camera module as defined in claim 16, wherein the lens is movably received within the housing.

21. A camera module as defined in claim 16, wherein, other than the second opening, the camera module is sealed to minimize any fluid communication between the interior of the camera module and the exterior of the camera module.

* * * * *